Figure 1:
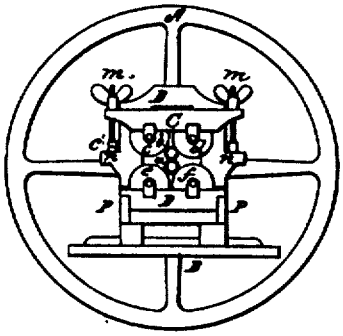

8857X

2 Sheets—Sheet 1.

W. WHITTEMORE, Jr.

Cotton Gin.

Patented May 29, 1835.

8857X

2 Sheets—Sheet 2.

W. WHITTEMORE, Jr.

Cotton Gin.

Patented May 29, 1835.

William Whittemore

The Schedule referred to in these Letters Patent and making part of the same containing a description in the words of the said William Whittemore the younger himself of his improvement in the machine used for separating seeds from Cotton called the roller Gin To all to whom these presents shall come. William Whittemore the younger of West Cambridge in the County of Middlesex and State of Massachusetts sends greeting Be it known that I the said William Whittemore have invented made and applied to use a new and useful improvement in the machine used for separating seeds from Cotton commonly called the Roller Gin. being an improvement upon my Machine or improvement for which Letters Patent were granted to me bearing date the seventh day of March in the year of our Lord Eighteen hundred and thirty four for a description of which improvement heretofore patented to me I refer to the specification and drawings annexed to the said Letters Patent and to the drawings thereof hereto annexed, And I do hereby specify my new improvement as follows, namely. The figures in the plate numbered one represent the patented improvement and the figures in the plate numbered two represent my new improvements thereon. In plate numbered two, figure one represents a side view of the Machine. figure numbered two represents a sectional view of said Machine. figure numbered three represents a birds eye view of said Machine.

I dispense with the endless leather band H represented in said drawing and described in said specification and with the roller G. the cleaner K. and the post B.K. and their necessary appendages represented in said drawings and described in said specification; and for the polished polished cast steel roller b, represented in said drawings and described in said specification I substitute a wooden roller, and I use another guard Z. Like the guard I repre-sented in said drawing and described in said specifi-cation to be applied to the roller (a) represented in said draw-ing: and described in said specification in the same way as the guard I. is applied to the roller b, at the same angle from a perpendicular, but upwards instead of downwards as is the guard I. The guards Z. and I. are fastened by means of screws to small projections on the posts B.B. which projections are represented in plate numbered two by a a. instead of being fastened as the guard I was represented to be fastened in my said specification. This roller is about eleven inches long and at the end three fourths of an inch in Diameter swelling gradually to about seven eighths of an inch in the middle part in order to allow for the springing and make all parts bear more equally on the under roller a. Instead of the wooden roller swelling it may be made throughout of the same Diameter and the steel. roller made to swell. I prefer however to have the wooden roller swell. Cast steel or wrought iron bearings are mov upon and pinned to the wooden roller towards each end of the friction rollers as represented and described in said drawing and specification. which I substitute for the said cast steel roller to move upon. This wooden roller is made of some very hard wood, I prefer walnut or hickory, if the wood is boiled either in linseed oil or water before being used it becomes much harder stiffer and firmer and much less liable to crack. This wooden roller should be turned or made as smooth as possible. The guard is of sheet iron and passes from below the centre of the frame, B to a little above the centre of the steel roller a. coming very nearly in contact with the roller in the same way as the guard

8857X

The object of these preventers is to prevent the cotton and cotton seeds from coming in contact with the friction roller. In my improved machine I also use screws M. M. M. M. with thumb nuts at each end of the piece of cast iron C. C. instead of using as before the screws m. m. at one end while the piece of cast iron C. C. moved upon the bolt S. at the other end as a hinge or swivel. The advantage of having screws at each end is that thereby the pieces of cast iron C.C. are made to regulate more equally the bearing and pressure of the friction rollers c.d. c.d. On the front side of the machine the screws m. m. are made with a joint e.e and small pieces a.a. are cut out of the pieces of cast iron C.C. so as to permit the screw m. m. on the front to be bent or turned down and the pieces of cast iron C.C. to be removed.

Figure 2:
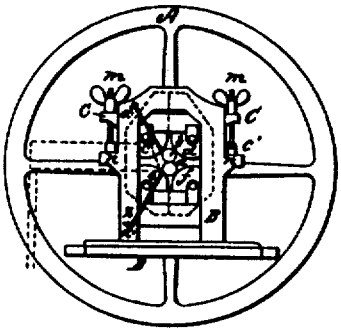
Figure 3:
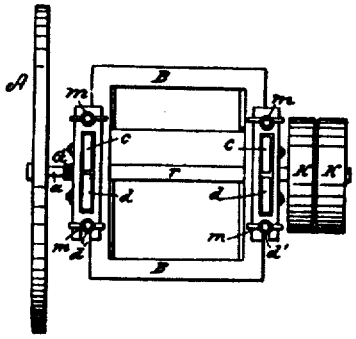
Figure 1:
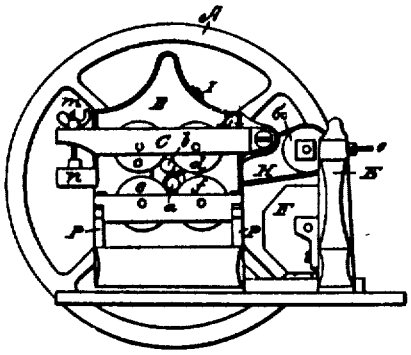
Figure 2:
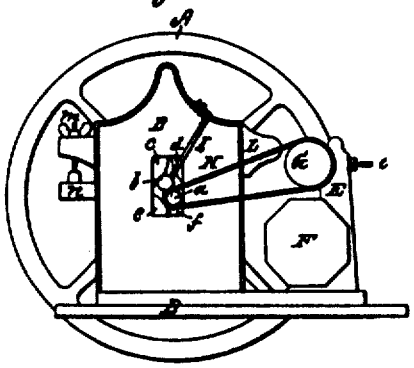
Figure 3:
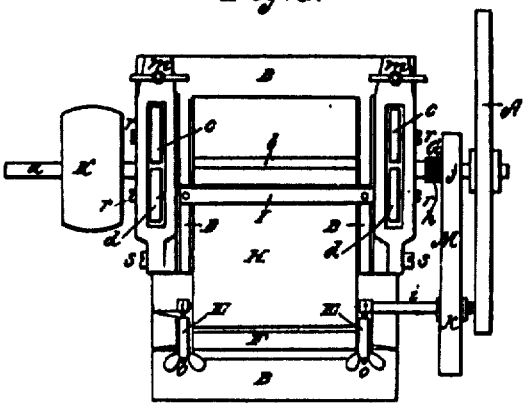

The object of this is to enable the operator to remove the wooden roller b. with more ease, speed and facility when it becomes worn or unfit for use, or when for any other cause it becomes desirable to remove it. I also use while operating my improved machine, a small wooden trough to receive the cotton represented in plate numbered two figure two by the red lines. This is placed upon the guard Z about one half of an inch from the upper edge. This trough is about seven inches long (and about seven inches wide. The object of this trough so applied (and used is to receive the cotton after the steel saws are passed out. This trough is composed of a flat piece of board with two sides placed at right angles about three and a half inches high and is supported by a support e. of the same width with the bottom piece (and about four inches long). What I claim as new (and as my invention and improvement is as follows to wit:

1st The construction, application and use of such wooden roller as aforesaid in connexion with such steel or guard X. is situated with respect to the roller b. excepting
that the guard I is applied downwards and the guard X.
upwards. The advantages of using such wooden rollers as I
have described with a metallic roller, instead of two me-
tallic rollers or two wooden rollers are that the band and
its appendages used with the metallic rollers may be dis-
pensed with. and the metallic lower roller a being draw-
filed or made rough will retain the roughness
sufficiently for drawing through the cotton longer than
a wooden roller; and such metallic roller cannot well
be used with an upper roller of metal without the use of
a leather band or some other thing between them. And
the wooden roller is much more easily made and less
expensive than a roller of steel, but not so durable, and one
steel roller will operate in connection with a wooden
roller as well or better than two wooden rollers. In my im-
proved machine I also use what I call preventers repr-
esented in plate numbered two figure by the dotted lines
[illegible] they are placed on the inside of each of the posts B B, These
preventers are each composed of two pieces of thin sheet iron
or other suitable material, one of these pieces is placed
on the posts B.B. at the back side of the Machine and
between the guards and the posts B.B. and is so con-
structed as to fit closely or very nearly so upon the
rollers. a (and) b. the other part is made to lap over the first
part at the top, and is there fastened with the other piece
to the post B.B. by the screw [illegible] which serves as a hinge
or swivel upon which both parts open and shut. This part
is so constructed as to shut down very closely or nearly so
like the other part upon the rollers a and b on the front
side of the Machine and when shut down presenting with
the other part nearly an uniform surface. These two parts
are constructed in the same manner (and) are precisely similar
The or metallic roller and such friction rollers and guards as are before mentioned or refered to and as are described in my said letters patent for the purpose of separating the seeds from cotton. 2nd. The application and use of the wooden trough placed against the guard Z in the manner combination and for the purpose herein before mentioned and described. 3d the construction. application and use of those parts which I call preventers represented by the dotted lines as aforesaid in plate numbered two fig 2 in the manner and combination and for the purpose aforesaid. In testimony whereof I have hereto set my hand this fifteenth day of October in the year of our Lord one thousand eight hundred and thirty four.

Witnesses
Augustus H. Fiske
Francis Gardner Jr

William Whittemore Jr

E.F.W.G.H.

1595 n-83]

(Drawing)